(12) United States Patent
He et al.

(10) Patent No.: US 12,564,797 B2
(45) Date of Patent: Mar. 3, 2026

(54) COUNTERCURRENT EXTRACTION DEVICE FOR SPINNING

(71) Applicant: ZHEJIANG AEGIS NEW MATERIALS CO., LTD., Zhejiang (CN)

(72) Inventors: Fei He, Zhejiang (CN); Yang Li, Zhejiang (CN); Qingfa Lai, Zhejiang (CN)

(73) Assignee: ZHEJIANG AEGIS NEW MATERIALS CO., LTD., Shaoxing (CN)

( * ) Notice: Subject to any disclaimer, the term of this patent is extended or adjusted under 35 U.S.C. 154(b) by 407 days.

(21) Appl. No.: 18/242,566

(22) Filed: Sep. 6, 2023

(65) Prior Publication Data

US 2023/0415069 A1     Dec. 28, 2023

Related U.S. Application Data

(63) Continuation of application No. PCT/CN2022/088006, filed on Apr. 20, 2022.

(30) Foreign Application Priority Data

May 19, 2021     (CN) ......................... 202110547128.X

(51) Int. Cl.
*B01D 11/02*          (2006.01)
*B01D 11/00*          (2006.01)

(52) U.S. Cl.
CPC ........ *B01D 11/0288* (2013.01); *B01D 11/028* (2013.01); *B01D 2011/002* (2013.01)

(58) Field of Classification Search
CPC ................................................. B01D 11/0288
See application file for complete search history.

(56) References Cited

U.S. PATENT DOCUMENTS

2020/0300369 A1     9/2020     Zhao et al.

FOREIGN PATENT DOCUMENTS

| CN | 201588017 U | 9/2010 |
|----|-------------|--------|
| CN | 203829694 U | 9/2014 |
| CN | 107252572 A | 10/2017 |
| CN | 107684736 A | 2/2018 |
| CN | 207137415 U | 3/2018 |

(Continued)

OTHER PUBLICATIONS

International Search Report to Corresponding Application No. PCT/CN2022/088006; 6 Pages; Jul. 15, 2022.

*Primary Examiner* — Jason Y Ko

(74) *Attorney, Agent, or Firm* — Cooper Legal Group, LLC

(57)     ABSTRACT

A countercurrent extraction device for spinning includes an extraction box containing extraction liquid, and the extraction box is provided with a plurality of partition assemblies, and the extraction box is partitioned into a plurality of extraction chambers by the partition assemblies; each of the partition assemblies includes a first plate and a second plate, two ends of the first plate are fixedly connected to two sidewalls of the extraction box, and a first gap is provided between a lower edge of the first plate and a bottom wall of the extraction box; a lower edge of the second plate is connected to the bottom wall of the extraction box, a second gap is provided between a top edge of the second plate and a top wall of the extraction box, and heights of a plurality of second plates are gradually decreased along a flow direction of the extraction liquid.

10 Claims, 6 Drawing Sheets

(56)          References Cited

FOREIGN PATENT DOCUMENTS

| | | | |
|---|---|---|---|
| CN | 207233846 | U | 4/2018 |
| CN | 109973660 | A | 7/2019 |
| CN | 110715055 | A | 1/2020 |
| CN | 212383221 | U | 1/2021 |
| CN | 113274759 | A | 8/2021 |
| JP | 11244604 | A | 9/1999 |

COUNTERCURRENT EXTRACTION DEVICE FOR SPINNING

CROSS-REFERENCE TO RELATED APPLICATION

This application is a continuation of PCT application serial no. PCT/CN2022/088006, filed on Apr. 20, 2022, which claims the priority and benefit of Chinese patent application serial no. 202110547128.X, filed on May 19, 2021. The entireties of PCT application serial no. PCT/CN2022/088006 and Chinese patent application serial no. 202110547128.X are hereby incorporated by reference herein and made a part of this specification.

TECHNICAL FIELD

The present application relates to the technical field of spinning device, and particularly to a countercurrent extraction device for spinning.

BACKGROUND ART

During spinning process, chemical fiber is formed from a spinning nozzle at first, cooled to be formed in a cooling bath, then subjected to an extraction process for eluting solvent. The chemical fiber spinning successively passes through a plurality of extraction tanks with different concentrations during the extraction process, and the extraction liquid is generally dichloromethane. When the chemical fiber passes through the extraction tanks, the solvent in a fiber can be eluted by the extraction liquid. Currently, a good extraction method is countercurrent extraction, by which fiber with a low oil content can be obtained, and the countercurrent extraction has a low consumption of the extraction liquid and a gentle extraction process.

Referring to FIG. 1, a current extraction device includes a plurality of extraction tanks containing different concentrations of extraction liquid, and a partition plate 11 is provided between two adjacent extraction tanks 10. A plurality of liquid-passing holes 12 is formed in the partition plate. The extraction liquid flows through the liquid-passing holes 12, and a conveying roller group 120 is rotationally connected in the extraction tank 10, so that a fiber is conveyed from one extraction tank 10 to the next extraction tank 10. The solvent can be quickly eluted since the extraction liquid flows along a countercurrent direction through the successive extraction tanks 10.

In the above related technology, during a countercurrent extraction process, the extraction liquid flows in an uncertain direction after passing through the liquid-passing holes. That is to say, after passing through one liquid-passing hole, the extraction liquid may flow back from another adjacent through-hole, and be mixed with the extraction liquid of previous extraction tank, resulting in a concentration gradient between a plurality of extraction tanks being decreased, thereby affecting the extraction effect.

SUMMARY

In order to reduce the possibility that the extraction liquid may flow back from another adjacent through-hole, and be mixed with the extraction liquid of previous extraction tank, and improve an extraction effect, the present application provides a countercurrent extraction device for spinning.

The present application provides a countercurrent extraction device for spinning, including an extraction box containing extraction liquid, wherein the extraction box is provided with a plurality of partition assemblies arranged at intervals, and the extraction box is partitioned into a plurality of extraction chambers by the partition assemblies; each of the plurality of partition assemblies includes a first plate and a second plate, wherein, the first plate and the second plate are both arranged at intervals, two ends of the first plate are fixedly connected to two sidewalls of the extraction box, and a first gap is provided between a lower edge of the first plate and a bottom wall of the extraction box; a lower edge of the second plate is connected to the bottom wall of the extraction box, a second gap is provided between a top edge of the second plate and a top wall of the extraction box, the top edge of the second plate is lower than a top edge of the first plate, and heights of a plurality of second plates are gradually decreased along a flow direction of the extraction liquid; and a liquid cavity, configured for unidirectional flow of extraction liquid from bottom to top, is provided between the first plate and the second plate in each of the plurality of partition assemblies.

In the above technical solution, the extraction box is partitioned into a plurality of extraction chambers by the partition assemblies. Extraction liquid circulation and concentration adjusting are conducted individually in each extraction chamber. The extraction liquid may contact with the first plate during continuous flowing, and only flow from the lower side of the first plate to the second plate due to a blocking effect. At the same time, the extraction liquid can only flow to the next extraction chamber unidirectionally due to a high liquid level of a front extraction chamber. Comparing with the related technology, the extraction liquid would almost not flow back from another adjacent extraction chamber, and be mixed with the extraction liquid of previous extraction chamber when flows along a flow direction of the extraction liquid, so the concentration gradient of each extraction chamber is maintained and the extraction effect is improved.

In an embodiment, a conveying roller group is provided in the extraction box, the conveying roller group includes two first rollers rotationally connected in two adjacent extraction chambers respectively, and a second roller rotationally connected above each of the plurality of partition assemblies.

By adopting the above technical solution, the spinning is limited in the extraction liquid by two first rollers and conveyed to the next extraction chamber by the second roller. When the extraction liquid flows, extraction can be conducted for the fiber in extraction liquids with different concentrations, so as to obtain a good extraction effect.

In an embodiment, each of roller ends of the first rollers and the second rollers is connected to an outer wall of the extraction box by a rotation structure provided outside the extraction box, respectively, the rotation structure provided outside the extraction box includes a rotation bearing provided at each of the roller ends and positioned at the outer wall of the extraction box and a sealing assembly provided at each of the roller ends, and the sealing assembly abuts against an inner wall of the extraction box.

By adopting the above technical solution, the roller ends are set on the outer wall of the extraction box, which can reduce a possibility of eluting the lubricating oil in rotation bearing by the extraction liquid, and internal extraction liquid and rotation structure provided outside the extraction box can be blocked by the sealing assembly, thereby improving a sealing effect.

In an embodiment, the outer wall of the extraction box is provided with a mounting base, the rotation bearing is mounted on the mounting base, and a through-hole config-
ured for the roller end to run through is formed in the
mounting base; the sealing assembly includes a stationary
ring inserted into the through-hole and sleeved on the roller
end, a movable ring fixedly connected to the roller end, and
a pressing assembly provided at the movable ring configured
for abutting against an end surface of the stationary ring.

By adopting the above technical solution, after the mount-
ing base is mounted, the stationary ring faces and contacts
with the movable ring, and the pressing assembly abuts
against an end surface of the stationary ring. When the first
roller or the second roller is rotated, an abutting state can be
maintained.

In an embodiment, the stationary ring includes an embed-
ded portion configured to be embedded into the through-hole
and a fixing portion connected to the embedded portion and
fixedly connected to the mounting base; a first sealing ring
groove is formed in the mounting base, at a side departing
from the rotation bearing, a first sealing ring is embedded in
the first sealing ring groove, and an external diameter of the
fixing portion is greater than an internal diameter of the
through-hole, but less than an external diameter of the first
sealing ring.

By adopting the above technical solution, when the sta-
tionary ring is mounted, the embedded portion will be
embedded between the roller end and the through-hole to
seal. When the fixing portion is fixed, the sealing ring abuts
against and is better fixed on the inner wall of the first
sealing ring groove, so as to improve the sealing effect.

In an embodiment, an accommodation ring groove is
formed in the movable ring at an inner side of the movable
ring, the accommodation ring groove is configured to
accommodate the pressing assembly, the pressing assembly
includes a pressing ring configured to be fixed along a
circumferential direction and an elastic component config-
ured for driving the pressing ring to abut against the sta-
tionary ring, in which the pressing ring is slidably connected
to the movable ring in axial direction and located in the
accommodation ring groove.

By adopting the above technical solution, the pressing
ring can slide along a radial direction to abut against the end
surface of the stationary ring under the action of the elastic
component. When the roller end is rotated, the pressing ring
can rotate simultaneously, so that it can reduce a possibility
of torsion when rotating under the above movable connec-
tion way.

In an embodiment, the elastic component is an expansion
ring with a V-shaped cross section, a tip portion of the
V-shaped cross section of the expansion ring is configured
towards the roller end, and the expansion ring abuts against
the pressing ring and the movable ring, respectively, at two
sides of the expansion ring.

By adopting the above technical solution, V-shaped cross
section enables the expansion ring to have an outward
expansion effect. And a fraction can be reduced during a
moving process since the tip portion of V-shaped cross
section of the expansion ring is configured towards the roller
end.

In an embodiment, the movable ring is provided with a
linkage component configured for driving the tip portion of
the V-shaped cross section of the expansion ring to move
towards a side departing from the roller end; and the linkage
component is connected to the movable ring and the expan-
sion ring, respectively.

By adopting the above technical solution, when the mov-
able ring moves, another side of the tip portion of the
V-shaped cross section of the expansion ring is driven to move towards a side departing from the roller end, while two
sides of the expansion ring will be separated, the expansion
ring can be maintained to abut against the stationary ring.

In an embodiment, the linkage component is a linkage
rope, a first end of the linkage rope is fixedly connected to
the movable ring, and a second end of the linkage rope is
fixedly connected to the tip portion of the cross section of the
expansion ring; a length of the linkage rope is greater than
a distance between the movable ring and the tip portion of
the cross section of the expansion ring.

By adopting the above technical solution, when the mov-
able ring begins to rotate, the expansion ring does not move,
but the linkage rope is elongated gradually until it is ten-
sioned, the linkage rope will incline towards the radial
direction. At this time, the expansion ring will rotate simul-
taneously due to an acting force of the linkage rope, in
particular, there is a component force along the radial
direction, so that a good abutting effect can be obtained due
to outward expanding of the expansion ring.

In an embodiment, a distance between adjacent partition
assemblies is not less than 8 meters, and the extraction liquid
is dichloromethane.

By adopting the above technical solution, the fiber in the
extraction chamber is in a state of suspending. Comparing
with a linkage mode of a plurality of rollers, the structure is
simple and it is also convenient for later maintenance.

In summary, the present application can achieve at least
one of the following beneficial technical effects.

1. The extraction box is partitioned into a plurality of
extraction chambers by the partition assemblies. When
the countercurrent extraction is conducted, the extrac-
tion liquid can flow in one direction by means of the
liquid level difference due to height variation of the
second plate, so that the extraction liquid would almost
not flow back from another adjacent extraction cham-
ber, and be mixed with the extraction liquid of previous
extraction chamber;

2. in terms of rotation setting of the roller end, the rotation
bearing is provided at the outer wall of the extraction
box, which can reduce a possibility of eluting the
lubricating oil by the extraction liquid, and it is con-
venient for maintenance of the rotation bearing; and 3. the linkage rope is driven to move together during the
rotating process, the expansion ring expands outward
through an acting force obliquely upward, such that the
pressing ring slides and abuts against the stationary
ring.

DETAILED DESCRIPTION

The present application will be further described in detail below in combination with the FIGS. 2-9.

Embodiment 1

Figure 1:
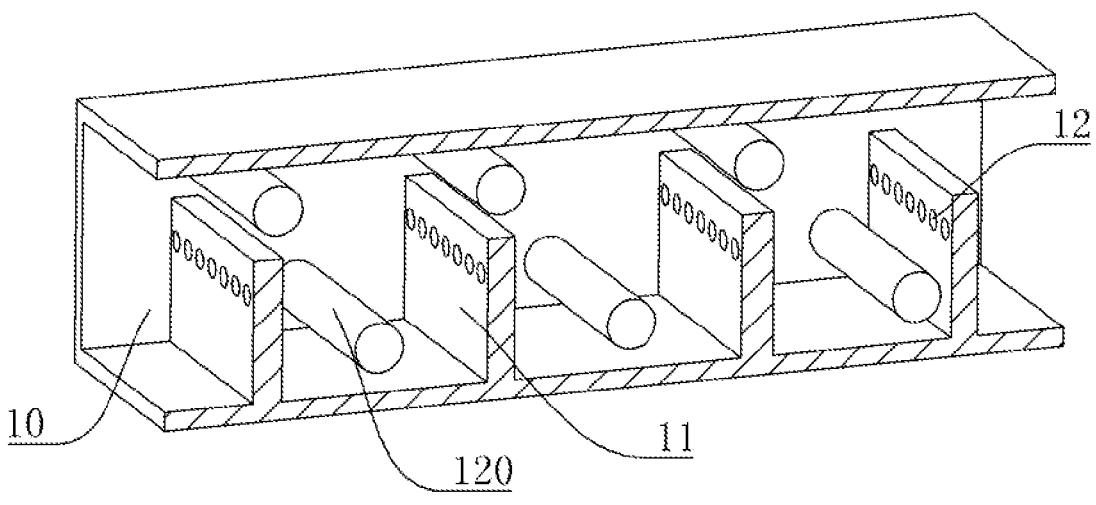
FIG. 1. is a structural schematic diagram of related
technology.
Figure 2:
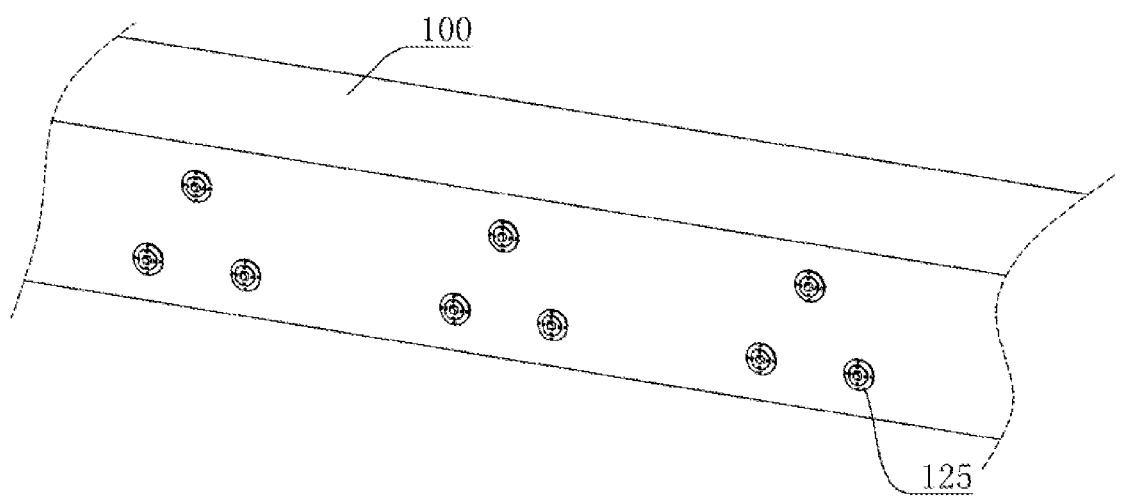
FIG. 2 is a structural schematic diagram of Embodiment
1 of the present application.
Figure 3:
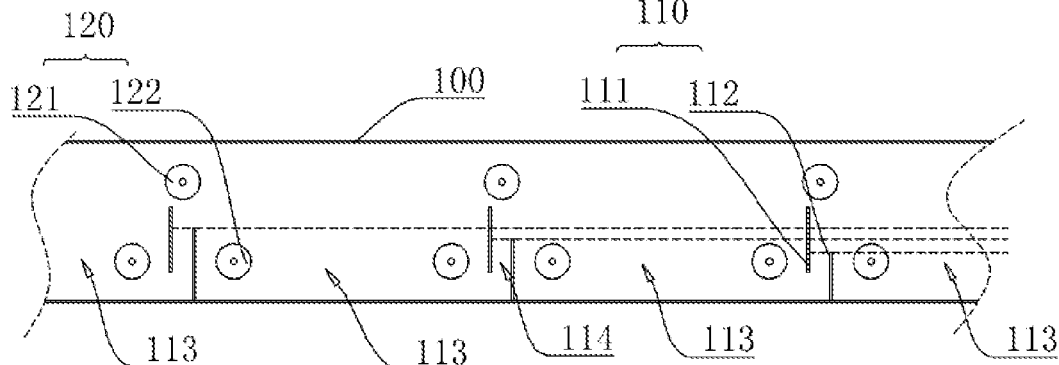
FIG. 3 is an inner structural schematic diagram of
Embodiment 1 of the present application.

The Embodiment 1 of the present application discloses a countercurrent extraction device for spinning, referring to FIGS. 2-3, including an extraction box 100 containing extraction liquid. The extraction liquid in this embodiment is dichloromethane. The extraction box 100 is provided with a plurality of partition assemblies 110 arranged at intervals, and a distance between adjacent two partition assemblies 110 is not less than 8 meters. The extraction box 100 is partitioned into a plurality of extraction chambers 113 by the plurality of partition assemblies 110, and a concentration gradient is formed due to different concentrations of the extraction liquid contained in the extraction chambers 113. In particular, the spinning moves from a first end of the extraction box 100 to a second end of the extraction box 100, and the extraction liquid also flows in the extraction box 100 and has an opposite flow direction with a fiber made, so that solvent in the fiber can be removed timely to optimize the extraction effect.

In this embodiment, referring to FIG. 3, the partition assembly 110 includes a first plate 111 and a second plate 112 arranged at intervals, two ends of the first plate 111 are fixedly connected to two sidewalls of the extraction box 100, and a first gap is provided between a lower edge of the first plate 111 and a bottom wall of the extraction box 100. Furthermore, a lower edge of the second plate 112 is connected to the bottom wall of the extraction box 100, a second gap is provided between a top edge of the second plate 112 and a top wall of the extraction box 100, and the top edge of the second plate 112 is lower than a top edge of the first plate 111.

A liquid cavity 114, for unidirectional flow of extraction liquid from bottom to top, is provided between the first plate 111 and the second plate 112 in each of the plurality of partition assemblies, that is, the extraction liquid can flow from lower side of the first plate 111 into the liquid cavity 114, and overflow the second plate 112 into the next extraction chamber 113.

In order to enable the extraction liquid to flow into the next extraction chamber 113 unidirectionally, in this embodiment, heights of a plurality of second plates 112 are gradually decreased along the flow direction of the extraction liquid. When the extraction liquid flows continuously, a higher liquid level can be remained at one side, so that the extraction liquid can only flow towards the liquid cavity 114 under gravity effect and remain a consistent flow direction. Therefore, a concentration gradient of the adjacent extraction chambers 113 can be maintained since the extraction liquid flows continuously, so as to reduce possibilities that the extraction liquid may flow back from another adjacent extraction chamber, and be mixed with the extraction liquid of previous extraction chamber.

Figure 4:
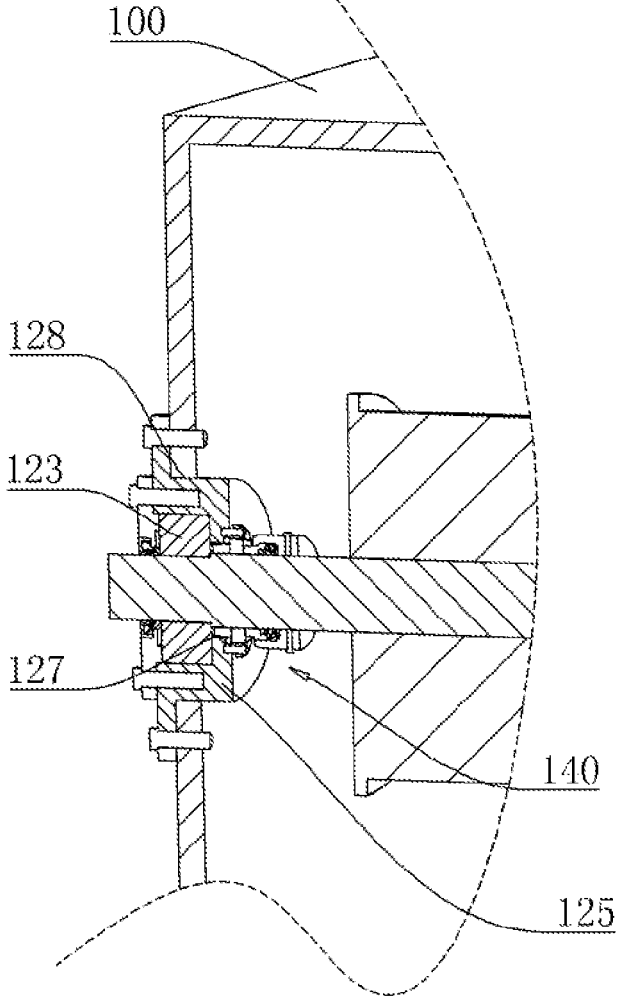
FIG. 4 is a partial schematic cross sectional view illus-
trating connection between a mounting base and an extrac-
tion box according to Embodiment 1 of the present appli-
cation.

Referring to FIGS. 3-4, in order to convey the fiber from one extraction chamber 113 to the next extraction chamber 113, a conveying roller group 120 is provided in the extraction box 100, the conveying roller group 120 includes two first rollers 122 rotationally connected in two adjacent extraction chambers 113 respectively, and a second roller 121 rotationally connected above each of the plurality of partition assemblies 110. The fiber runs through a lower side of the first roller 122, then runs through an upper side of the second roller 121, and runs through a lower side of the next first roller 122.

Figure 5:
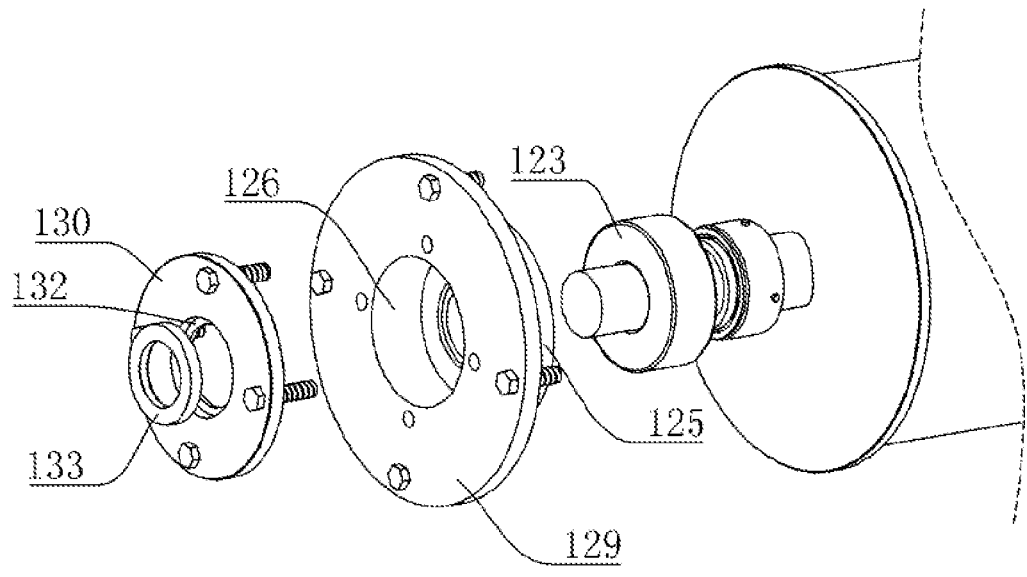
FIG. 5 is a partial explosion view illustrating connection
between a mounting base and a cover plate according to
Embodiment 1 of the present application.

Referring to FIGS. 4-5, in order that a lubricating oil of bearing on rotation ends of roller ends of the first roller 122 and the second roller 121 are not dissolved by the extraction liquid, each of roller ends of the first roller 122 and the second roller 121 is connected to an outer wall of the extraction box 100 by an rotation structure provided outside the extraction box 100, respectively, the rotation structure provided outside the extraction box includes a rotation bearing 123 provided at the roller end and a sealing assembly 140 provided at the roller end, and the sealing assembly 140 abuts against an inner wall of the extraction box 100. The rotation bearing 123 is mounted on the roller end, and the outer wall of the extraction box 100 is provided with a mounting base 125 for mounting the rotation bearing 123. The mounting base 125 is defined with a mounting groove 126 for insertion of the rotation bearing 123, and a through-hole 127 configured for the roller end to run through is formed at the bottom of the mounting groove 126. The sealing assembly 140 is configured for sealing a gap between the through-hole 127 and the roller end.

Figure 6:
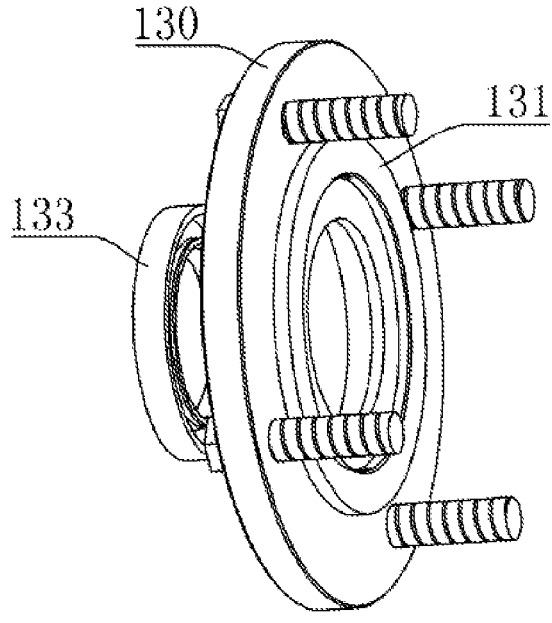
FIG. 6 is a structural schematic diagram of a cover plate
for illustrating a limit block according to Embodiment 1 of
the present application.

A sidewall of the extraction box 100 is defined with a mounting hole 128 for insertion of the mounting base 125, a flange 129 is formed at the periphery of the mounting base 125, the flange attaches on an edge of the mounting hole 128, and the flange 129 is fixedly mounted on the outer wall of the extraction box 100 by a screw. After the rotation bearing 123 is embedded into the mounting groove 126, the mounting base 125 is fixedly mounted with a cover plate 130 configured to cover the mounting groove 126, and the cover plate 130 is provided with a limit ring 131 for abutting against the rotation bearing 123, as shown in FIG. 6. The rotation bearing 123 can be fixedly mounted in the mounting groove 126 by the limit ring 131.

Referring to FIGS. 5-6, in order to reduce ingress of the external dust and leakage of internal lubricating oil, the cover plate 130 is provided with an oil seal ring 133, a side of the cover plate 130 departing from the rotation bearing 123 is provided with an oil seal ring groove 132, and the oil seal ring 133 is mounted in the oil seal ring groove 132.

Figure 7:
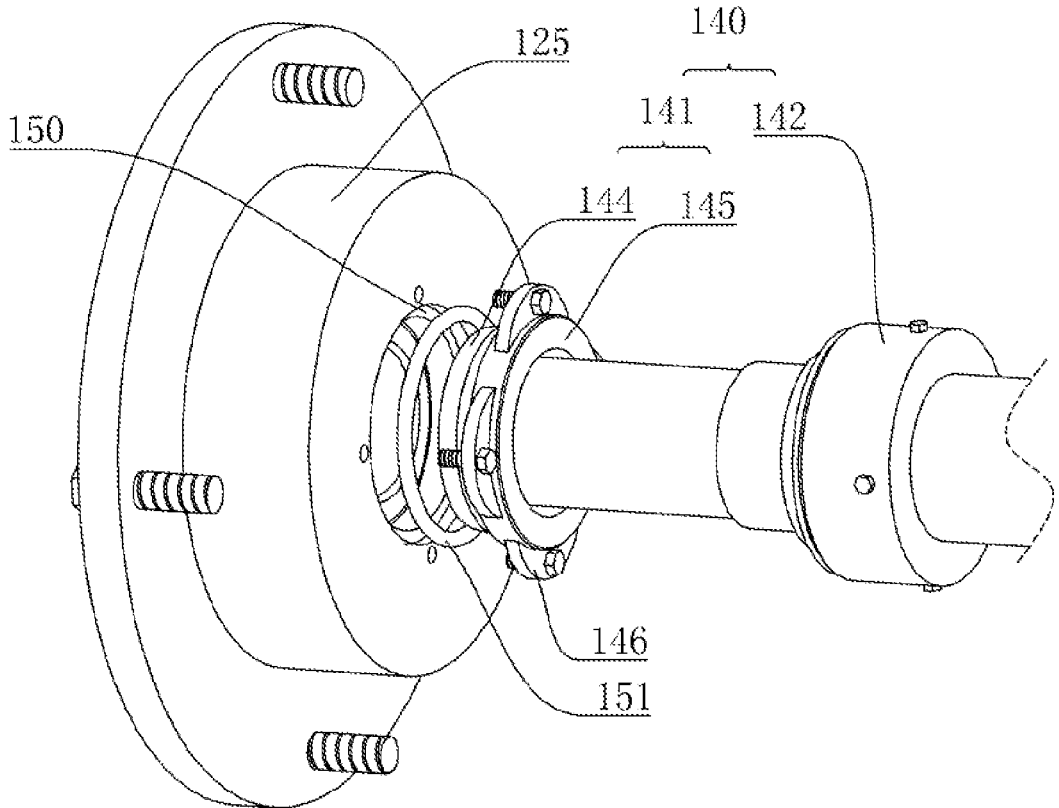
FIG. 7 is a structural schematic diagram of a sealing assembly according to Embodiment 1 of the present application.

Referring to FIG. 7, the sealing assembly 140 includes a stationary ring 141 inserted into the through-hole 127 and sleeved on the roller end, a movable ring 142 fixedly connected to the roller end, and a pressing assembly provided at the movable ring 142 for abutting against an end surface of the stationary ring 141. The stationary ring 141 includes an embedded portion 144 embedded into the through-hole 127 and a fixing portion 145 connected to the embedded portion 144 and fixedly connected to the mounting base 125, a plurality of engaging lugs 146 are connected at the periphery of the fixing portion 145, and the engaging lugs 146 are fixedly mounted on an outer wall of the mounting base 125.

A first sealing ring groove 150 is formed in the mounting base 125 at a side departing from the rotation bearing 123, a first sealing ring 151 is embedded in the first sealing ring groove 150. An external diameter of the fixing portion 145 is greater than an internal diameter of the through-hole 127, but less than an external diameter of the first sealing ring 151. When the engaging lug 146 is fixedly mounted on the mounting base 125, the fixing portion 145 abuts against and presses the first sealing ring 151, the first sealing ring 151 can be deformed, so as to maintain a good sealing effect.

Figure 8:
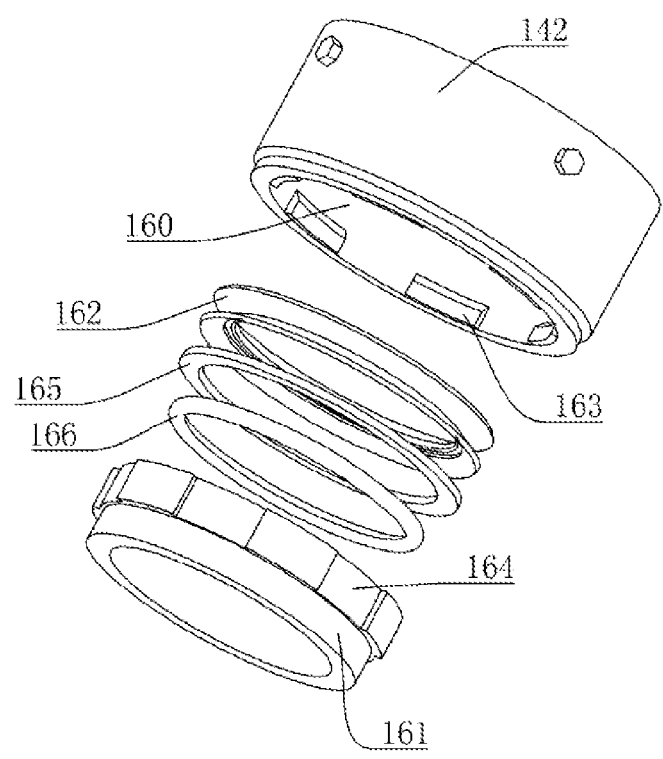
FIG. 8 is a schematic diagram illustrating connection between a movable ring and a pressing ring according to Embodiment 1 of the present application.

Referring to FIGS. 7-8, an accommodation ring groove 160 is formed in the movable ring 142 at an inner side of the movable ring 142, the accommodation ring groove 160 is configured to accommodate the pressing assembly, the pressing assembly includes a pressing ring 161 configured to be fixed along a circumferential direction and an elastic component configured for driving the pressing ring 161 to abut against the stationary ring 141, in which the pressing ring 161 is slidably connected to the movable ring 142 in axial direction and located in the accommodation ring groove 160. An inner wall of the accommodation ring groove 160 is provided with a plurality of limit blocks 163 along the circumferential direction, and an outer wall of the pressing ring 161 is provided with a plurality of limit grooves 164 corresponding to the top limit blocks 163, the top limit block 163 is embedded in the limit groove 164. The limit groove 164 is provided along an axial direction. When the movable ring 142 is rotated with the roller end, the pressing ring 161 can rotate synchronously.

The elastic component in this embodiment is an expansion ring 162 with a V-shaped cross section. A tip portion of the V-shaped cross section of the expansion ring 162 is configured towards the roller end, and the expansion ring 162 abuts against the pressing ring 161 and the expansion ring 162, respectively. The pressing ring 161 slides along the axial direction due to an external expansion force of the expansion ring 162 and abuts against the stationary ring 141. A shim 165 is provided between the expansion ring 162 and the pressing ring 161. In order to further improve the tightness, and a second sealing ring 166 is embedded at an inner wall of the pressing ring 161 at a side facing to the expansion ring 162.

An implementation principle for Embodiment 1 of the present application is as follows. The extraction liquid flows along a countercurrent direction of fiber. When an inflow can be maintained, the extraction liquid passes through each extraction chamber 113 due to a liquid level difference, and flows unidirectionally by means of the partition assembly 110, such that the possibility that the extraction liquid flows back and is mixed with the extraction liquid of previous extraction chamber is reduced.

Moreover, the rotation bearing 123 is provided on the outer wall of the extraction box 100. When the movable ring 142 rotates, the V-shaped expansion ring 162 maintains a tendency to expand outward, so that the pressing ring 161 can abut against an end surface of the stationary ring 141, therefore, a good sealing performance can be maintained, and the possibility of dissolving a lubricating oil in the rotation bearing 123 by the extraction liquid is reduced.

Embodiment 2

Figure 9:
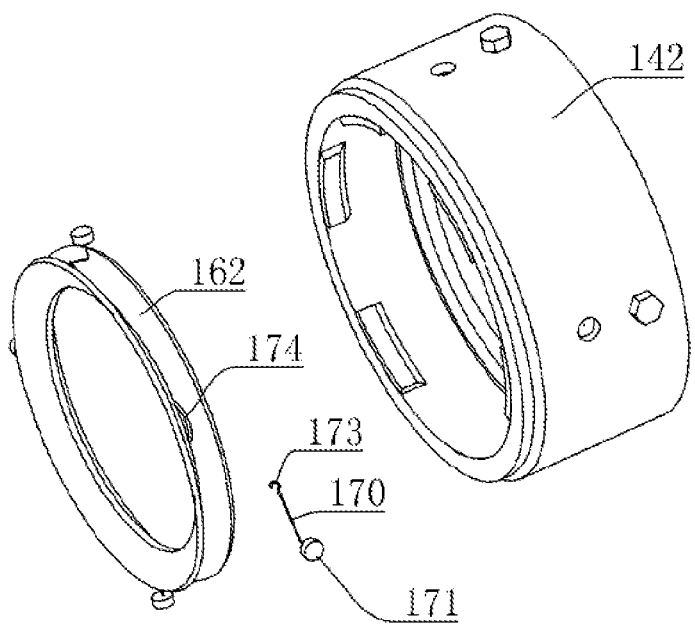
FIG. 9 is a schematic diagram illustrating connection between an expansion ring and a linkage rope according to Embodiment 2 of the present application.

The Embodiment 2 is same as the Embodiment 1 except that, referring to FIG. 9, the movable ring 142 is provided with a linkage component for driving the tip portion of the V-shaped cross section of the expansion ring 162 to move towards a side departing from the roller end. The linkage component is connected to the movable ring 142 and expansion ring 162, respectively. A plurality of linkage components are provided along the circumferential direction, which are linkage ropes 170. In this embodiment, the linkage ropes 170 is made of plastic material, and the linkage ropes 170 also can be a rigid rope such as steel wire and the like.

A first end of the linkage rope 170 is provided with a stop block 171, and the movable ring 142 is defined with a counter bore 172 for the stop block 171 to be embedded. The linkage rope 170 passes through the counter bore 172 to connect the stop block 171, and a second end of the linkage rope 170 is provided with a hook 173. An inward concave side of the expansion ring 162 is provided with a hanging ring 174 for the hook 173 to be hooked, the hanging ring 174 is provided along a circumferential direction of the expansion ring 162, and a length of the linkage rope 170 is greater than a radial distance between the movable ring 142 and the inward concave side of the expansion ring 162. When the movable ring 142 rotates, the linkage rope 170 is elongated at first, and when the linkage rope 170 is tensioned, it will incline towards the radial direction, so as to pull an inner side of the expansion ring 162. The expansion ring 162 is deformed since two sides of the expansion ring 162 is limited. An oblique force of the linkage rope 170 acts on the expansion ring 162 in the circumferential direction and the redial direction, thereby improving the sealing effect.

The above are the preferred embodiments of the present application, which are not intended to limit the protection scope of the present application. Therefore, all equivalent changes made according to the structure, shape and principle of the present application should fall within the protection scope of the present application.

LIST OF REFERENCE MARKS 10. extraction tank
11. partition plate
12. liquid-passing hole
100. extraction box
110. partition assembly
111. first plate
112. second plate
113. extraction chamber
114. liquid cavity
120. conveying roller group
122. first roller
121. second roller
123. rotation bearing
125. mounting base
126. mounting groove
127. through-hole
128. mounting hole
129. flange
130. cover plate
131. limit ring
132. oil seal ring groove
133. oil seal ring
140. sealing assembly
141. stationary ring
142. movable ring
144. embedded portion
145. fixing portion
146. engaging lug
150. first sealing ring groove
151. first sealing ring
160. accommodation ring groove
161. pressing ring
162. expansion ring 163. limit block
164. limit groove
165. shim
166. second sealing ring
170. linkage rope
171. stop block
172. counter bore
173. hook
174. hanging ring

What is claimed is:

1. A countercurrent extraction device for spinning, comprising an extraction box containing extraction liquid, wherein the extraction box is provided with a plurality of partition assemblies arranged at intervals, and the extraction box is partitioned into a plurality of extraction chambers by the plurality of partition assemblies;

each of the plurality of partition assemblies comprises a first plate and a second plate, wherein the first plate and the second plate are both arranged at intervals, two ends of the first plate are fixedly connected to two sidewalls of the extraction box, and a first gap is provided between a lower edge of the first plate and a bottom wall of the extraction box; a lower edge of the second plate is connected to the bottom wall of the extraction box, a second gap is provided between a top edge of the second plate and a top wall of the extraction box, the top edge of the second plate is lower than a top edge of the first plate, and heights of a plurality of the second plates are gradually decreased along a flow direction of the extraction liquid; and a liquid cavity, configured for unidirectional flow of the extraction liquid from bottom to top, is provided between the first plate and the second plate in each of the plurality of partition assemblies.

2. The countercurrent extraction device for spinning according to claim 1, wherein a conveying roller group is provided in the extraction box, the conveying roller group comprises two first rollers rotationally connected in two adjacent extraction chambers respectively, and a second roller rotationally connected above each of the plurality of partition assemblies.

3. The countercurrent extraction device for spinning according to claim 2, wherein each of roller ends of the two first rollers and the second roller is connected to an outer wall of the extraction box by a rotation structure provided outside the extraction box, respectively, the rotation structure provided outside the extraction box comprises a rotation bearing provided at each of the roller ends and positioned at the outer wall of the extraction box and a sealing assembly provided at each of the roller ends, and the sealing assembly abuts against an inner wall of the extraction box.

4. The countercurrent extraction device for spinning according to claim 3, wherein the outer wall of the extraction box is provided with a mounting base, the rotation bearing is mounted on the mounting base, a through-hole configured for each of the roller ends to run through is formed in the mounting base, the sealing assembly comprises a stationary ring inserted into the through-hole and sleeved on each of the roller ends, a movable ring fixedly connected to each of the roller ends, and a pressing assembly provided at the movable ring configured for abutting against an end surface of the stationary ring.

5. The countercurrent extraction device for spinning according to claim 4, wherein the stationary ring comprises an embedded portion configured to be embedded into the through-hole and a fixing portion connected to the embedded portion and fixedly connected to the mounting base, a first sealing ring groove is formed in the mounting base, at a side departing from the rotation bearing, a first sealing ring is embedded in the first sealing ring groove, and an external diameter of the fixing portion is greater than an internal diameter of the through-hole, but less than an external diameter of the first sealing ring.

6. The countercurrent extraction device for spinning according to claim 5, wherein an accommodation ring groove is formed in the movable ring at an inner side of the movable ring, the accommodation ring groove is configured to accommodate the pressing assembly, the pressing assembly comprises a pressing ring configured to be fixed along a circumferential direction and an elastic component configured for driving the pressing ring to abut against the stationary ring, wherein the pressing ring is slidably connected to the movable ring in axial direction and located in the accommodation ring groove.

7. The countercurrent extraction device for spinning according to claim 6, wherein the elastic component is an expansion ring with a V-shaped cross section; and a tip portion of the V-shaped cross section of the expansion ring is configured towards each of the roller ends, and the expansion ring abuts against the pressing ring and the movable ring, respectively, at two sides of the expansion ring.

8. The countercurrent extraction device for spinning according to claim 7, wherein the movable ring is provided with a linkage component configured for driving the tip portion of the V-shaped cross section of the expansion ring to move towards a side departing from each of the roller ends; and the linkage component is connected to the movable ring and the expansion ring, respectively.

9. The countercurrent extraction device for spinning according to claim 8, wherein the linkage component is a linkage rope, a first end of the linkage rope is fixedly connected to the movable ring, and a second end of the linkage rope is fixedly connected to the tip portion of the V-shaped cross section of the expansion ring; and a length of the linkage rope is greater than a distance between the movable ring and the tip portion of the V-shaped cross section of the expansion ring.

10. The countercurrent extraction device for spinning according to claim 1, wherein a distance between adjacent partition assemblies of the plurality of partition assemblies is not less than 8 meters, and the extraction liquid is dichloromethane.

* * * * *